(12) United States Patent
Carter et al.

(10) Patent No.: US 12,100,521 B2
(45) Date of Patent: Sep. 24, 2024

(54) NUCLEAR REACTOR FLOW CONTROL DEVICES AND ASSOCIATED REACTORS, COMPONENTS, AND METHODS

(71) Applicants: Battelle Energy Alliance, LLC, Idaho Falls, ID (US); University of Idaho, Moscow, ID (US)

(72) Inventors: John P. Carter, Idaho Falls, ID (US); Richard Christensen, Idaho Falls, ID (US)

(73) Assignees: Battelle Energy Alliance, LLC, Idaho Falls, ID (US); University of Idaho, Moscow, ID (US)

( * ) Notice: Subject to any disclaimer, the term of this patent is extended or adjusted under 35 U.S.C. 154(b) by 0 days.

(21) Appl. No.: 17/936,248

(22) Filed: Sep. 28, 2022

(65) Prior Publication Data
US 2023/0106379 A1     Apr. 6, 2023

Related U.S. Application Data

(60) Provisional application No. 63/261,776, filed on Sep. 28, 2021.

(51) Int. Cl.
*G21C 19/28*     (2006.01)
*G21C 15/12*     (2006.01)

(52) U.S. Cl.
CPC ............. *G21C 15/12* (2013.01); *G21C 19/28* (2013.01)

(58) Field of Classification Search
CPC ........ G21C 15/12; G21C 15/04; G21C 19/28; G21C 7/32; G21D 3/001; G21D 3/04
See application file for complete search history.

(56) References Cited

U.S. PATENT DOCUMENTS

| | | | | |
|---|---|---|---|---|
| 3,030,293 A | * | 4/1962 | Leslie | G21C 3/38 |
| | | | | 165/184 |
| 3,063,925 A | * | 11/1962 | Huet | G21C 3/32 |
| | | | | 165/110 |
| 3,177,123 A | * | 4/1965 | Huet | G21C 3/28 |
| | | | | 376/370 |
| 3,339,631 A | * | 9/1967 | McGurty | F28F 13/08 |
| | | | | 376/454 |
| 3,378,453 A | * | 4/1968 | Gorker | G21C 3/04 |
| | | | | 976/DIG. 45 |
| 3,420,737 A | * | 1/1969 | Marchal | G21C 15/24 |
| | | | | 976/DIG. 200 |

(Continued)

FOREIGN PATENT DOCUMENTS

| | | | | |
|---|---|---|---|---|
| DE | 202016102977 U1 | * | 10/2017 | F01N 3/2892 |
| WO | 1999/059160 A1 | | 11/1999 | |

OTHER PUBLICATIONS

Sabharwall et al., Liquid Fuel Nuclear Power Generation Devices and Associated Components and Systems, U.S. Appl. No. 63/261,775, filed Sep. 28, 2021, 36 pages.

(Continued)

*Primary Examiner* — Lily C Garner
(74) *Attorney, Agent, or Firm* — TraskBritt

(57) ABSTRACT

A flow control device configured to be positioned in a reactor core. The flow control device including a central shaft and at least one blade extending helically from the central shaft. A nuclear reactor and related systems and methods are also disclosed.

19 Claims, 9 Drawing Sheets

(56) References Cited

U.S. PATENT DOCUMENTS

| | | | | | |
|---|---|---|---|---|---|
| 3,629,065 | A | * | 12/1971 | Knox | G21C 15/06 976/DIG. 19 |
| 4,132,115 | A | * | 1/1979 | Benemann | G01K 13/02 376/463 |
| 4,406,011 | A | * | 9/1983 | Burns | G01F 23/288 376/258 |
| 4,853,177 | A | * | 8/1989 | Pettus | G21C 3/16 376/418 |
| 5,130,082 | A | * | 7/1992 | Oosterkamp | F22B 37/32 376/377 |
| 8,895,901 | B2 | | 11/2014 | Wortmann et al. | |
| 8,974,556 | B2 | * | 3/2015 | Tada | B01J 8/0469 422/625 |
| 10,043,594 | B2 | | 8/2018 | Scott | |
| 10,170,207 | B2 | * | 1/2019 | Bashkirtsev | G21C 3/34 |
| 2011/0294083 | A1 | | 12/2011 | Wiley et al. | |
| 2013/0083878 | A1 | | 4/2013 | Massie et al. | |
| 2018/0330836 | A1 | * | 11/2018 | Arafat | G21C 15/12 |
| 2019/0237205 | A1 | | 8/2019 | Abbott et al. | |

OTHER PUBLICATIONS

Brzozowski et al., "Flow Chemistry: Intelligent Processing of Gas-Liquid Transformations Using a Tube-in-Tube Reactor", Accounts of Chemical Research, vol. 48, 2015, 14 pages.

Chen et al., "Experimental Study on Start-Up and Steady State Characteristics of Passive Residual Heat Removal System for 2 MW Molten Salt Reactor", Energy, vol. 147, 2018, 13 pages.

Dong et al., "Experimental Investigation on the Heat Transfer Performance of Molten Salt Flowing in an Annular Tube", Experimental Thermal and Fluid Science, vol. 102, 2019, 10 pages.

Fenske et al., "The Macroscopic Behavior of Fast Reactor Fuel Subjected to Simulated Thermal Transients", Transactions of the American Nuclear Society, vol. 45, Jun. 1983, 6 pages.

Litchford et al., "Design of a Resistively Heated Thermal Hydraulic Simulator for Nuclear Rocket Reactor Cores", Collection of Technical Papers, 43rd AIAA/ASME/SAE/ASEE Joint Propulsion Conference, vol. 6, 2007, 13 pages.

Muhammad et al., "Fully Developed Darcy-Forchheimer Mixed Convective Flow Over a Curved Surface With Activation Energy and Entropy Generation", Computer Methods and Programs in Biomedicine, vol. 188, 2020, 6 pages.

Perlmutter et al., "Unsteady Laminar Flow in a Duct With Unsteady Heat Addition", Journal of Heat Transfer, Transactions of the ASME, vol. 83, Nov. 1961, 9 pages.

Sparrow et al., "Laminar Flow of a Heat-Generating Fluid in a Parallel-Plate Channel", A.I.Ch.E. Journal, vol. 9, No. 6, Nov. 1963, 8 pages.

Srivastava et al., "Experimental and Theoretical Studies on the Natural Circulation Behavior of Molten Salt Loop", Applied Thermal Engineering, vol. 98, 2016, 9 pages.

Yang et al., "Mass Transport and Reactions in the Tube-in-Tube Reactor", Organic Process Research & Development, vol. 17, 2013, 7 pages.

* cited by examiner

NUCLEAR REACTOR FLOW CONTROL DEVICES AND ASSOCIATED REACTORS, COMPONENTS, AND METHODS

CROSS-REFERENCE TO RELATED APPLICATION

This application claims the benefit under 35 U.S.C. § 119(e) of U.S. Provisional Patent Application Ser. No. 63/261,776, filed Sep. 28, 2021, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

Embodiments of the present disclosure generally relate to flow control elements. In particular, embodiments of the present disclosure relate to flow control devices for nuclear reactors and associated nuclear reactors, components, systems, and methods.

BACKGROUND

Nuclear reactors contain and control nuclear chain reactions that produce heat through a physical process called fission, where a particle (e.g., a neutron) is fired at an atom, which then splits into two smaller atoms and some additional neutrons. Some of the released neutrons then collide with other atoms, causing them to also fission and release more neutrons. A nuclear reactor achieves criticality (commonly referred to in the art as going critical) when each fission event releases a sufficient number of neutrons to sustain an ongoing series of reactions. Nuclear reactors may include a fluid, such as a cooling fluid, flowing through the nuclear reactor configured to transfer heat from the reactor chamber to a heat collection region, where the heat may be removed and/or converted into electricity.

SUMMARY

Embodiments of the disclosure may include a flow control device configured to be positioned in a reactor core. The flow control device includes a central shaft and at least one blade extending helically from the central shaft.

Another embodiment of the disclosure may include a nuclear reactor. The reactor may include a reactor core including a helical fluid flow control element configured to induce helical flow in a fluid traveling through the reactor core.

Another embodiment of the disclosure may include a method of controlling fluid flow through a nuclear reactor. The method may include inducing a flow of a fluid upward through a core of a nuclear reactor. The method may further include causing the fluid to flow helically about a central axis of the core, the core comprising at least one helical feature configured to cause the helical flow.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

The illustrations presented herein are not meant to be actual views of any particular nuclear reactor or component thereof, but are merely idealized representations employed to describe illustrative embodiments. The drawings are not necessarily to scale.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

Nuclear power generation devices may include a fluid, such as a cooling fluid, flowing through the nuclear power generation devices to transfer heat from one portion of the device to another. In some embodiments, a nuclear fuel, such as uranium (e.g., uranium 233, uranium 235), plutonium, or thorium, may be dissolved in a fluid. Dissolving the nuclear fuel in a fluid may enable the fuel and the cooling fluid to be one and the same, which may reduce the complexity of the nuclear reactor and reduce costs of creating the nuclear reactor. Controlling a flow of the fluid through the reactor may enable the efficiency of the reactor to increase. Controlling the flow of the fluid through the reactor may also reduce pressure losses in the fluid, which may enable and/or improve efficiency in the flow inducing systems, such as pump systems or enabling flow through natural convection (e.g., inducing flow through temperature differences and eliminating the pumps in the system).

Figure 1:
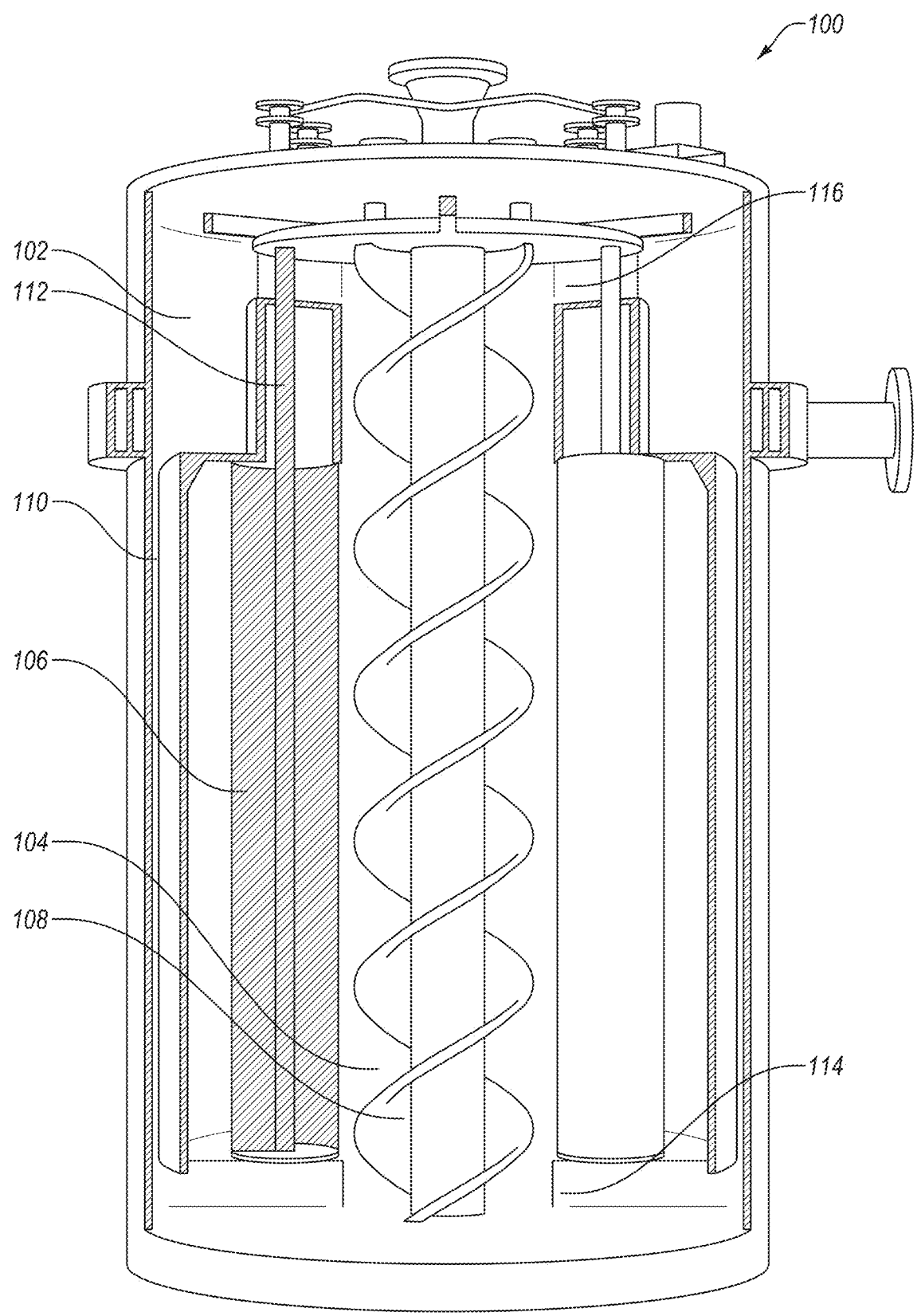
FIG. 1 illustrates a sectional view of a reactor in accordance with embodiments of the present disclosure.

FIG. 1 illustrates an embodiment of a reactor 100. The reactor 100 may include a core 104. The core 104 may be the region of the reactor 100 where the free neutrons are present that cause the chain nuclear reactions in the nuclear fuel. In some embodiments, the nuclear fuel may be dissolved in a molten salt to form a liquid fuel solution configured to flow through the reactor. In other embodiments, such as solid fuel reactors, the core may include solid fuel, such as fuel rods, and a cooling fluid, such as a molten metal, may flow around the fuel rods removing heat from the fuel rods.

The core 104 may be positioned in a central portion of the reactor 100. The core 104 may include inlets 114 below the core 104 and outlets 116 above the core 104. The inlets 114 may be configured to provide a fluid path into the core 104 for the fluid and the outlets 116 may be configured to provide a fluid path out of the core 104 for the fluid. In both solid fuel reactors and liquid fuel reactors the fluid, whether a liquid fuel solution or a cooling fluid, may be configured to transfer the heat from the core 104 to a heat exchanger 102.

In a liquid fuel reactor, the nuclear reactions in the core 104 may heat the liquid fuel solution. In some embodiments, the heated liquid fuel solution may rise within the core 104 through natural convection. As the heated liquid fuel solution rises the heated liquid fuel solution may be replaced by cooled liquid fuel solution through the inlets 114 below the core 104. The heated liquid fuel solution may rise through the core 104 before exiting the core 104 through the outlets 116. In other embodiments, the liquid fuel solution may move through the core 104 under pressure induced by another mechanical system, such as a pump. Examples of a liquid fuel reactor are described in U.S. Provisional Patent Application No. 63/261,775 LIQUID FUEL NUCLEAR POWER GENERATION DEVICES AND ASSOCIATED COMPONENTS AND SYSTEMS, filed Sep. 28, 2021, and U.S. Patent Application LIQUID FUEL NUCLEAR POWER GENERATION DEVICES AND ASSOCIATED COMPONENTS AND SYSTEMS, filed on even date herewith, the disclosure of both of which are incorporated herein, in their entirety, by this reference.

The core 104 may include a flow control element 108 (e.g., flow control device) configured to slow the upward flow of the liquid fuel solution. As described below, the flow control element 108 may include a helical plane (e.g., wrapped helix on an inclined plane) or helical blade. Slowing the upward flow of the heated liquid fuel solution may lengthen the amount of time that the liquid fuel solution remains in the core 104, which may increase the number of reactions in the liquid fuel solution. Increasing the number of reactions may increase the heat generated in the liquid fuel solution. Increasing the amount of time that the liquid fuel solution remains in the core 104 may also increase the efficiency of the reactions. For example, some neutrons may have a delayed release. After an atom is split some neutrons may take up to 30 seconds to release from the split portions of the atom. Maintaining the liquid fuel solution within the core 104 until the last of the delayed neutrons are released may increase the reaction efficiency by increasing the effective number of free neutrons available to cause additional reactions within the core 104. While the flow control element 108 may be configured to transfer heat, the flow control element 108 is separate (e.g., distinct) from the heat exchanger 102.

In a solid fuel reactor, the flow control element 108 may have a similar effect on the flow of the cooling fluid. Slowing the upward flow of the cooling fluid may increase the amount of time that the cooling fluid is able to collect heat generated by the fuel rods. Increasing the time that the cooling fluid is collecting heat from the fuel rods may increase a temperature of the cooling fluid which may increase an efficiency of the heat transfer through the reactor, such as by creating a larger temperature difference across the heat exchanger 102 and/or a larger temperature difference from one end of the core 104 to the other end of the core 104.

The outlets 116 may be coupled to a heat exchanger 102. The heat exchanger 102 may include a device configured to capture the heat from the fluid and convert the heat into another type of energy, such as rotational movement, linear movement, electricity, etc. For example, the heat exchanger 102 may include a sterling engine, configured to convert heat into electrical energy. The heat exchanger 102 may be configured to transfer heat from the liquid fuel solution to another fluid. The other fluid may then pass through the device to capture and/or convert the heat. The heat exchanger 102 may be configured to substantially remove the heat generated in the core 104 cooling the liquid fuel solution.

The fluid may exit the heat exchanger 102 and travel downward through a fluid passage 110. In some embodiments, the downward flow may be induced by natural convection, similar to the upward flow in the core 104. In other embodiments, the flow of the fluid may be controlled externally, such as through a pump. The cooled fluid may enter the core 104 through the inlets 114 positioned below the core 104.

The core 104 may be substantially surrounded by insulating or shielding materials. The insulating and/or shielding materials may substantially limit the number of neutrons leaving the core 104, which may increase the efficiency of the reaction therein. Furthermore, the insulating and/or shielding materials may act as shielding configured to limit the amount of radiation leaving the core 104 to protect surrounding people and/or equipment from the radiation.

The reactor 100 may also include one or more control drums 106 disposed around the core 104. The control drums 106 may be configured to control the intensity of the reaction within the core 104 by rotating to adjust a proximity of a neutron absorbing material to the core 104. The control drums 106 and their operation is described in further detail below. The control drums 106 and drive shafts 112 of the control drums 106 may be positioned outside the flow paths of the fluid, such that the control drums 106 and the respective drive shafts 112 do not come into contact with the fluid.

In some embodiments, the reactor 100 may include control rods (not pictured). Control rods may be configured to control the intensity of the reaction similar to control drums. The control rods may be formed entirely from a neutron absorbing material. The control rods may control the reaction by being inserted and/or removed from the core 104. For example, a fully inserted control rod may stop the reaction by absorbing substantially all of the free neutrons within the core 104, a partially inserted control rod may slow the reactions by absorbing a portion of the free neutrons, and a fully removed control rod may allow all free neutrons within the core 104 to contribute to causing additional reactions.

Figure 2:
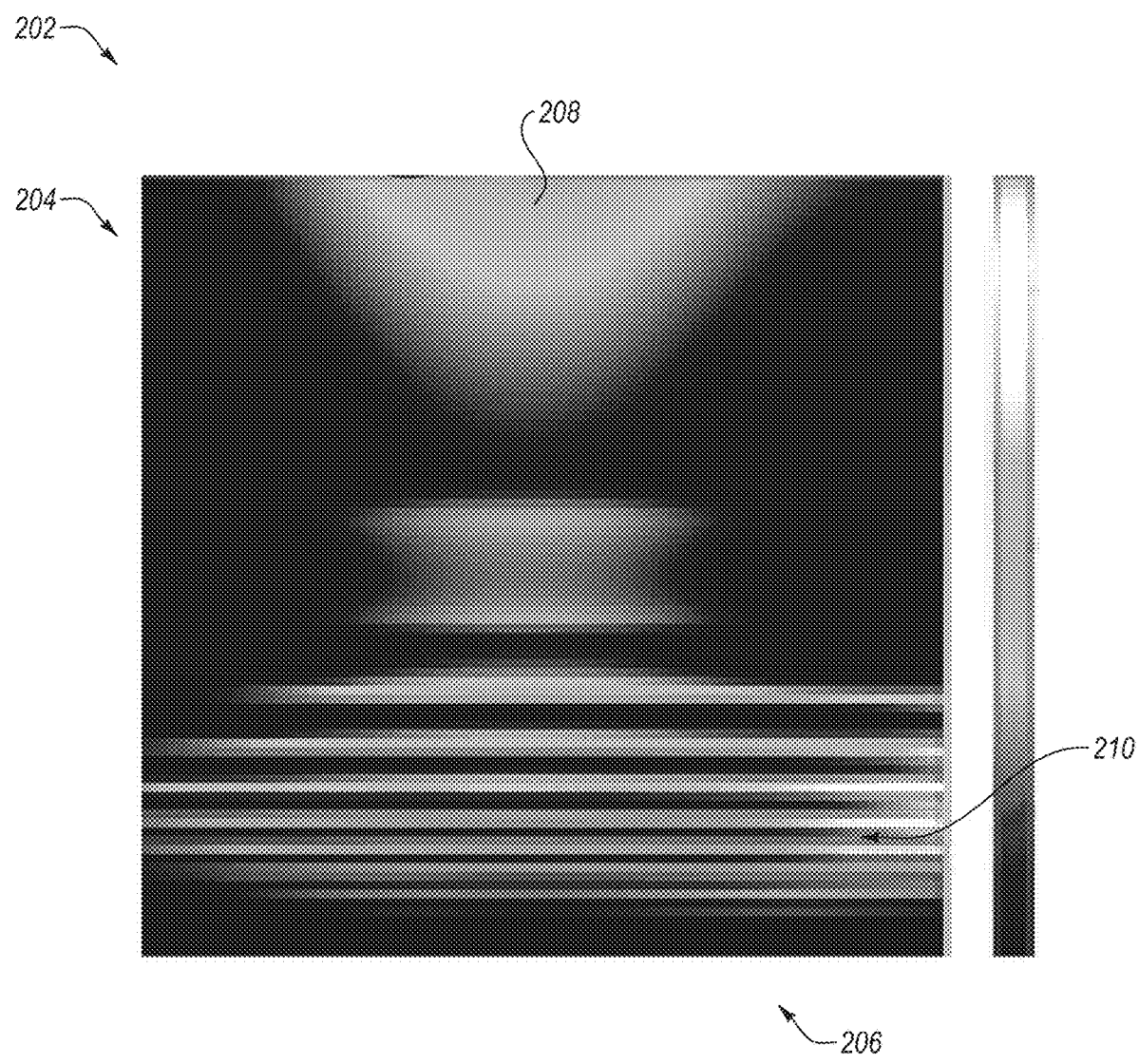
FIG. 2 illustrates a neutron activity model in accordance with embodiments of the present disclosure.

FIG. 2 illustrates a neutron activity model 202 for a liquid fuel reactor having a cylindrical core with no flow control element. The neutron activity model 202 may visually represent the neutron activity in both a vertical position 204 and a horizontal position 206 within the core. The liquid fuel may travel upward through the core as described above. As illustrated in FIG. 2, the greatest amount of neutron activity may occur in the lower section 210 of the core with some additional activity occurring in an upper section 208 of the core. As illustrated in the neutron activity model 202 as the liquid fuel travels vertically, there may be sections where there is neutron activity separated by sections where there is little to no neutron activity. The separation between areas of neutron activity may be caused by the delayed release neutrons described above. As described above, a flow control element 108 may slow the upward flow, which may increase the amount of neutron activity within the core.

Figure 3A:
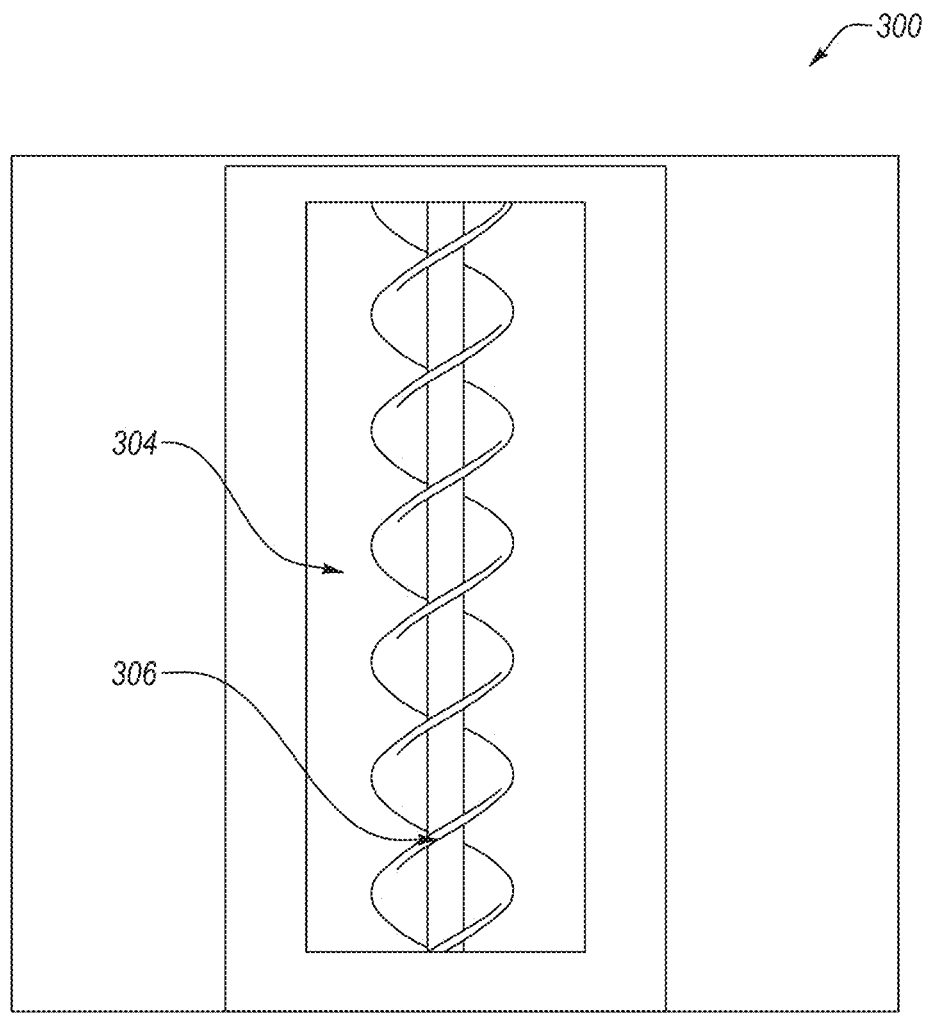
FIG. 3A illustrates a model of a reactor in accordance with embodiments of the present disclosure.

FIG. 3A illustrates a liquid fuel reactor 300 including a flow control element 306, such as the flow control element 108 illustrated in FIG. 1, extending through the core 304. As illustrated, the flow control element 306 may include a helical plane or blade, such as a screw extending through the core 304. The flow control element 306 may slow the upward movement of the liquid fuel by increasing a length of the fluid pathway through which the liquid fuel passes as the liquid fuel travels upward through the core 304. For example, rather than flowing straight upward, similar to the flow in the reactor represented in FIG. 2, the liquid fuel in the liquid fuel reactor 300 according to embodiments of the disclosure may follow a spiral or corkscrew path, which may be substantially longer than the height of the core 304.

Figure 3B:
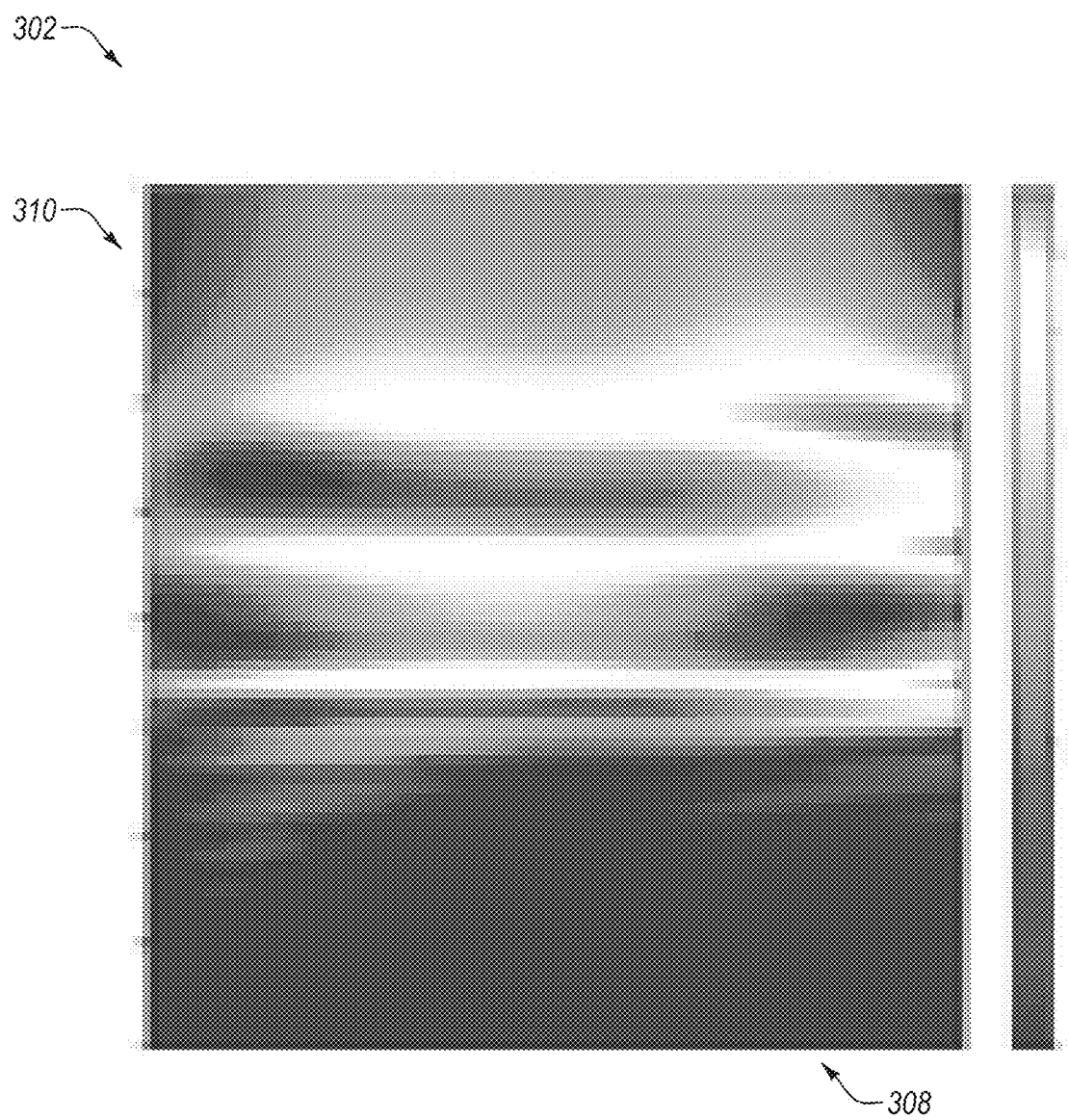
FIG. 3B illustrates a neutron activity model of the reactor of FIG. 3A.

FIG. 3B illustrates the neutron activity model 302 of the the liquid fuel reactor 300. Similar to the neutron activity model 202 described above, the neutron activity model 302 may visually represent the neutron activity in both a vertical position 310 and a horizontal position 308 within the core 304. As illustrated in the neutron activity model 302 the neutron activity within the core 304 may be significantly greater for the the liquid fuel reactor 300 with the flow control element 306 in comparison with the neutron activity in the core of the reactor with no flow control element. The neutron activity may also occur over a larger vertical area within the flow control element 306. The slower upward movement of the liquid fuel may enable a greater number of the delayed neutrons to release within the core 304 and contribute to the neutron activity. The delayed neutrons may cause the neutron activity to increase as the liquid fuel rises in the core 304.

Furthermore, as illustrated in the neutron activity model 302, the neutron activity may be more evenly dispersed throughout the core 304. A more even distribution of the neutron activity may increase a stability of the power response (e.g., the response to a change in power demand) of the the liquid fuel reactor 300. For example, when there is a change to the power demand on the the liquid fuel reactor 300, the temperature and/or pressure of the cooled fluid that enters the core 304 may change. The change in the temperature of the fluid entering the core 304 may change the pressure and/or upward flow speed of the fluid through the core 304, which may change the amount of heat generated in the fluid as the fluid passes through the core 304. A more even distribution of neutron activity may result in an even change to the heat generated in the fluid, such that the response to a change in power demand is more even (e.g., stable) having fewer and less extreme spikes and/or dips in temperature.

Figure 4:
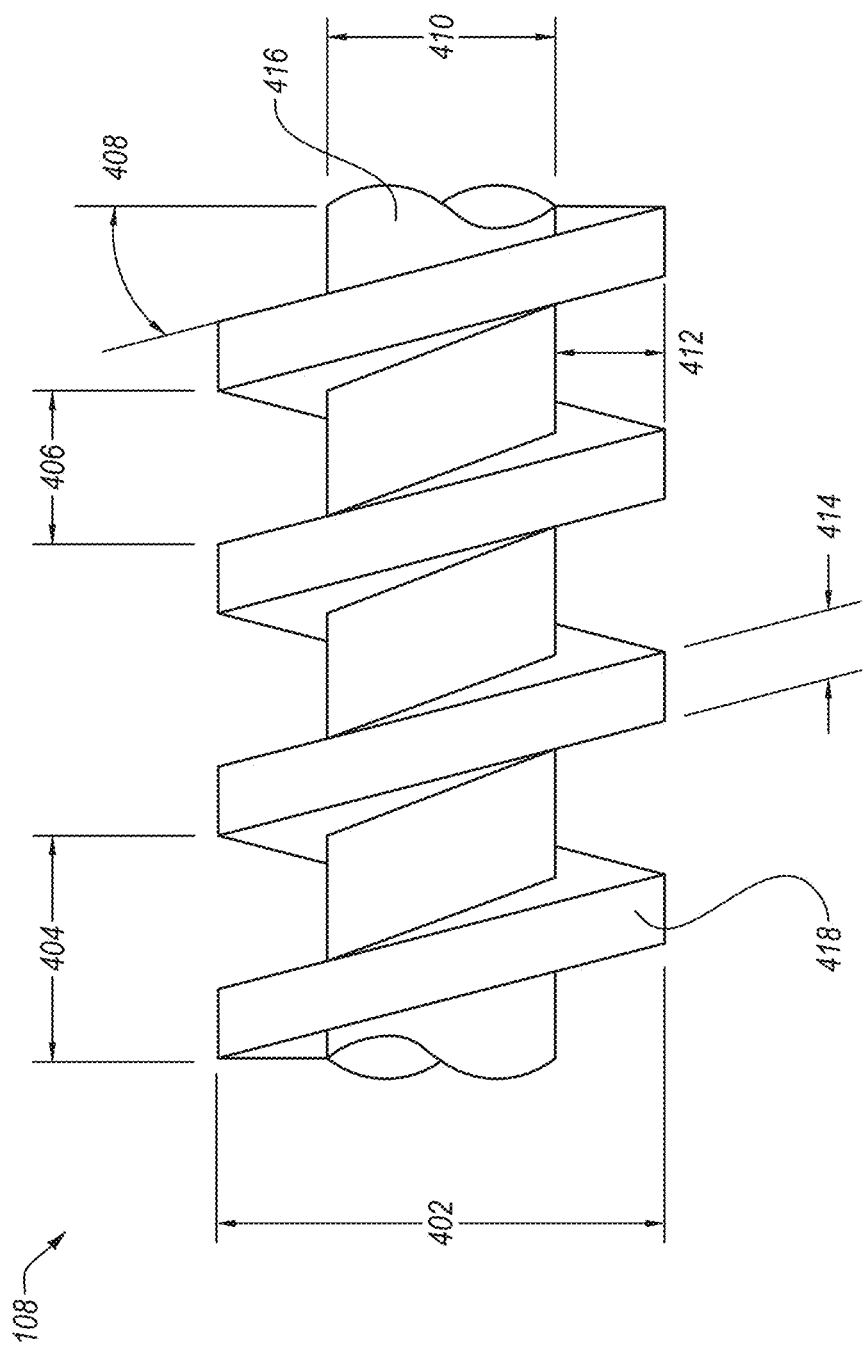
FIG. 4 illustrates a segment of a flow control element in accordance with embodiments of the present disclosure.

FIG. 4 illustrates a segment of the flow control element 108. The flow control element 108 may include one or more blades 418 extending from a shaft 416. The one or more blades 418 may be arranged helically about the shaft 416 to form a helix or spiral along the shaft 416. The flow control element 108 may be formed from a moderating material (e.g., a material having minimal neutron absorbing properties, a neutral material), such as graphite or beryllium, Forming the flow control element 108 from a moderating material, may enable the flow control element 108 to be positioned within the core 104, while having minimal effect on the free neutrons occurring therein.

In some embodiments, surface cladding may be employed over one or more surfaces of the flow control element 108. Surface cladding may facilitate the moderating properties of the flow control element 108, such as by maintaining the redox potential of the material (e.g., the restriction of the transfer of electrons or neutrons to or from the material) of the flow control element 108. Surface cladding may also promote preferential deposition in a molten salt core 304. The surface cladding may also increase a strength and/or rigidity of the associated flow control element 108.

The flow control element 108 may be designed based on the application, operating conditions, fuel type, cooling fluid type, etc. For example, reducing a diameter 402 of the one or more blades 418 may reduce a pressure loss across the core 104. Reducing the pressure loss may enable the fluid (e.g., liquid fuel solution or cooling fluid) to flow upward through the core 104 through natural convection (e.g., without the use of external pumps). On the other hand, increasing the diameter 402 of the one or more blades may increase the swirl effect on the fluid flow, which, as discussed above, may increase the amount of time the fluid remains in the core 104. The diameter 402 of the one or more blades 418 may be determined based on a viscosity of the fluid, which may depend on factors, such as the composition of the fluid, the operating temperature of the reactor, and the pressure within the core 104. The diameter 402 of the one or more blades 418 may be related to a diameter of the core 104. For example, the diameter 402 of the one or more blades 418 may be between about 20% of the diameter of the core 104 and about 100% of the diameter of the core 104, such as between about 50% of the diameter of the core 104 and about 100% of the diameter of the core 104. In some embodiments, the diameter 402 of the one or more blades 418 may vary through the core 104. For example, the diameter 402 of the one or more blades 418 may be smaller at a bottom inlet end of the core 104 and larger at a top outlet end of the core 104. In other embodiments, the diameter 402 of the one or more blades 418 may be larger at the bottom inlet end of the core 104 and smaller at the top outlet end of the core 104.

Similar to the diameter 402 of the one or more blades 418, a root diameter 410 (e.g., the diameter of the shaft 416) may also effect the pressure loss and/or swirl effect of the one or more blades 418. For example, reducing the root diameter 410 may increase a channel depth 412 between the one or more blades 418. The channel depth 412 may define the surface area of the one or more blades 418 that are in contact with the fluid. Increasing the surface area of the one or more blades 418 may increase the swirl effect on the fluid flow. Thus, increasing the channel depth 412 without increasing the diameter 402 (e.g., maintaining the diameter 402) of the one or more blades 418 may increase the swirl effect on the fluid flow with minimal effect on the pressure loss. For example, as the diameter 402 of the one or more blades 418 approaches the diameter of the core 104, the pressure loss across the core 104 may increase. The fluid dynamic properties of the swirl affect in the fluid flow may decrease the pressure loss across the core 104. Thus, the diameter 402 of the one or more blades 418 and the root diameter 410 may be selected to create the swirl affect and pressure loss through the core 104 that is desired for the respective application.

An angle 408 of the one or more blades 418 may be selected to determine a pitch 404 of the one or more blades 418. The pitch 404 of the blades 418 may determine the number of times each of the one or more blades 418 wraps around the shaft 416 in a specific axial distance. The angle 408 of the one or more blades 418 may also determine a channel width 406 (e.g., distance between the blades 418). For example, for a single blade 418 the channel width 406 may be similar to the pitch 404. A smaller angle 408 may result in a smaller channel width 406 and pitch 404 (e.g., more wraps of the blade 418 over a similar area). Increasing the number of wraps of the one or more blades 418 may increase the surface area of the one or more blades 418 in the core 104. Increasing the number of wraps of the one or more blades 418 may also increase the time that the fluid is in the core 104. For example, increasing the number of wraps of the one or more blades 418 may increase the distance that the fluid travels as the fluid travels up through the core 104 by increasing the number of revolutions the fluid passes through.

The blade width 414 of each blade 418 may provide strength and/or rigidity to the blade 418, such that the blade 418 may substantially maintain its shape under the forces induced by the fluid as the fluid travels through the core 104. The blade width 414 may also define the amount of the material of the flow control element 108 that is present in the core 104. The blade width 414 may be adjusted to place an amount of the moderator material of the flow control element 108 within the core 104 that is sufficient to moderate the neutrons within the core 104 without absorbing the free neutrons and/or absorbing large amounts of energy from the free neutrons and reducing an efficiency of the reactions in the core 104. For example, the blade width 414 may be increased to increase the mass of the moderator material of the flow control element 108 in the core 104 or the blade width 414 may be decreased to decrease the mass of the moderator material in the core 104. In some embodiments, the blade width 414 may vary throughout the flow control element. For example, the blade width 414 may be different in different segments of the flow control element, as described in further detail below in FIG. 5.

Figure 5:
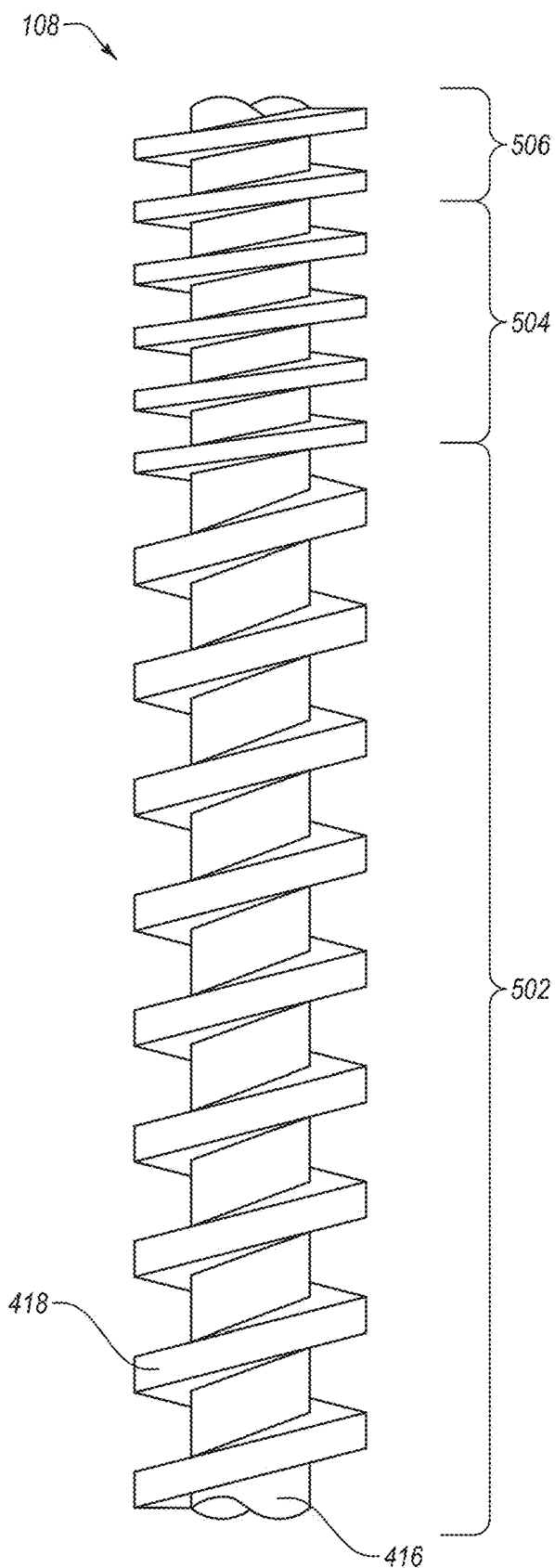
FIG. 5 illustrates a flow control element in accordance with embodiments of the present disclosure.

FIG. 5 illustrates a flow control element 108 having multiple segments or stages. For example, the flow control element 108 may have a lower segment 502, a middle segment 504 and an upper segment 506. The number and/or size of each segment 502, 504, 506 may be determined based on the application, operating conditions, fuel type, cooling fluid type, etc. For example, a flow control element 108 may include at least one segment, such as at least three segments, at least four segments, or at least five segments. In some embodiments, each segment may be substantially the same length. In other embodiments, the segments may each have different lengths.

The flow control element 108 illustrated in FIG. 5 may illustrate a flow control element 108 for use in a liquid fuel nuclear reactor. The pitch 404 of the blades 418 may be configured to provide a substantially even distribution of neutron activity throughout the core 104. For example, the lower segment 502 may have a larger pitch 404 than the middle segment 504 and the upper segment 506. The smaller pitch 404 in the middle segment 504 and the upper segment 506 may provide a greater amount of time for the delayed neutrons. The initial reactions and the initially released neutrons may contribute to the neutron activity in the lower segment 502 while the delayed neutrons may contribute to the neutron activity in the middle segment 504 and the upper segment 506.

The pitch 404 of the blades 418 may be configured to control the time that the fluid spends in each segment 502, 504, 506. For example, decreasing a pitch 404 of the blades 418 may increase the amount of time that the fluid spends in the respective segments 502, 504, 506, whereas increasing the pitch 404 may decrease the amount of time that the fluid spends in the respective segments 502, 504, 506. In some embodiments, the flow control element 108 may be configured to slow the upward flow such that the travel time through the core 104 is at least about 20 seconds, such as at least about 30 seconds.

In some embodiments, the materials used in the different segments 502, 504, 506 may be different. The materials may be independently selected depending on the application, operating conditions, fuel type, cooling fluid type, etc., of the flow control element 108. For example only, the lower segment 502 and the middle segment 504 may be formed from moderating materials or neutral materials, such as graphite or beryllium and the upper segment 506 may be formed from a reflective material (e.g., a material configured to reflect neutrons), such as steel, tungsten carbide, water, graphite, beryllium, natural uranium, zirconium silicide, or gold. The moderating or neutral materials in the lower segment 502 and the middle segment 504 may be configured to moderate the neutrons within the core 104 without absorbing the free neutrons. The reflective material in the upper segment 506 may be configured to reflect the free neutrons present in the upper segment 506 down into the core 104. The upper segment 506 may be configured to reduce the number of free neutrons exiting the core 104. Reducing the number of free neutrons exiting the core may increase the efficiency of the reactions occurring within the core by increasing the number of neutrons contributing to the reactions. Increasing the efficiency may enable the amount of fuel used in the reactor to be decreased and/or increase the life-cycle of the reactor.

In other embodiments, other elements of the flow control element 108 may be changed between the segments 502, 504, 506, such as the diameter 402 of the blades 418, channel depth 412, channel width 406, blade width 414, etc. In some embodiments, the one or more segments 502, 504, 506 may be configured to have other properties, such as flow directing functions, thermal-hydraulic functions, and/or core-physics functions.

Figure 6:
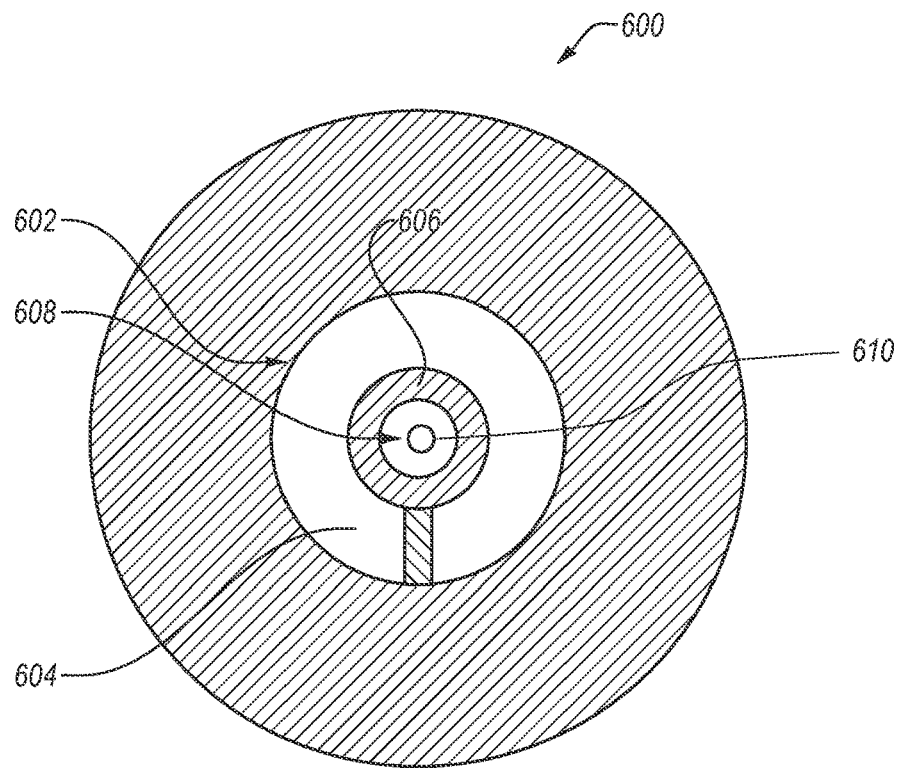
FIG. 6 through FIG. 9 illustrate cross-sectional views of a reactor including different embodiments of a flow control element in accordance with embodiments of the present disclosure.

FIG. 6 through FIG. 9 illustrate top down cross-sections of a reactor including different embodiments including of flow control elements. FIG. 6 illustrates a reactor 600 including a helical flow control element 604 positioned in the core 602 of the reactor 600. As illustrated in FIG. 6, the blades of the helical flow control element 604 may extend from a shaft 606 to an outer wall of the core 602, such that the fluid passing through the core 602 is forced to follow the path defined by the helical flow control element 604. As illustrated in FIG. 6, the shaft 606 may include a central cavity 608. The central cavity 608 may enable elements, such as electronic elements 610 (e.g., sensors, heater, etc.) to be positioned within the shaft 606. Positioning electronic elements 610 within the shaft 606 may enable electronic interaction with the core 602, such as for taking sensor readings in the core 602, initiating start-up sequences, and/or initiating shut-down sequences. For example, positioning heating elements within the shaft 606 may provide melt initiation around the helical flow control element. Melt initiation may change a solid fuel to a molten solution, such as a molten salt solution to initiate flow through the associated reactor. Initiating the melting process at the helical flow control element 604 may cause the molten solution around the center of the core to melt first and create a flow channel during start up, where the initial reactions may begin to occur and generate the additional heat to melt the rest of the molten solution in the core 602. Positioning sensors in the shaft 606 may facilitate the measurement of temperatures, pressures, flow, flux, etc., around a centerline of the core 602.

Figure 7:
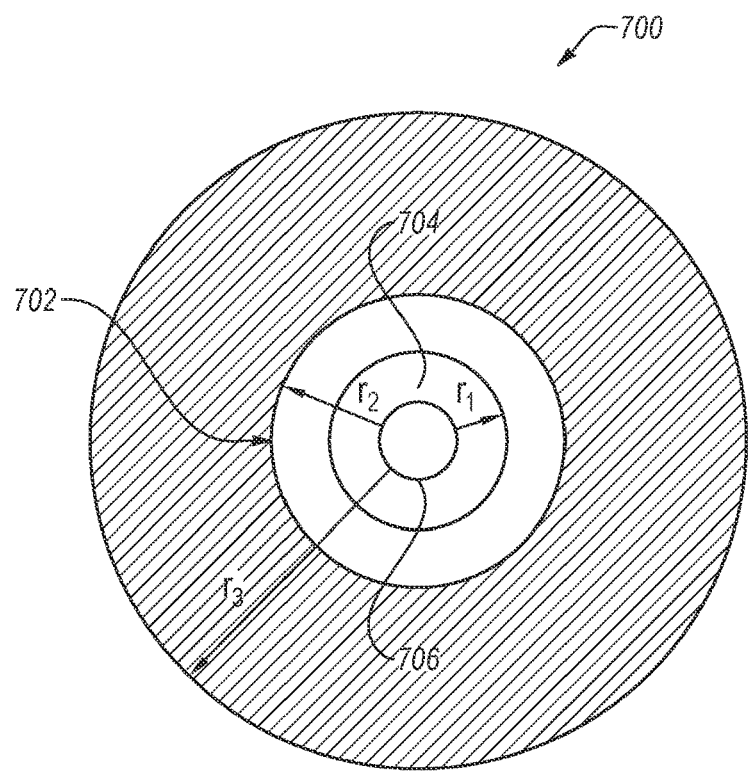

FIG. 7 illustrates a reactor 700 including a helical flow control element 704 in the core 702 of the reactor 700. The blades of the helical flow control element 704 may have a radius r1 that is less than a radius r2 of the core 702. Thus, a portion of the fluid may pass around the blades of the helical flow control element 704 in the space between the blades of the helical flow control element 704 and the wall of the core 702. The helical path created by the helical flow control element 704 may induce a swirl effect on the fluid flow, which may transfer to the fluid passing between the blades and the wall of the core 702 through viscous forces in the fluid. Thus, the fluid passing through the core 702 may travel in a helical path even when not in contact with the helical flow control element 704.

In another embodiment, the blades of the helical flow control element 704 may extend from the wall of the core 702, such that a gap may be formed between the blades of the helical flow control element 704 and the shaft 706. For example, the radius r1 may define the gap between the blades of the helical flow control element 704 and the shaft 706. A portion of the fluid passing through the core 702 may pass between the blades of the helical flow control element 704 and the shaft 706 with the swirl effect being transferred through viscous forces in the fluid.

As described above, reducing the area covered by the helical flow control element 704 may reduce the pressure loss in the core 702. Thus, the gaps between the helical flow control element 704 and the shaft 706 or the wall of the core 702 may reduce the pressure loss in the core 702, while the swirl effect induced in the fluid by the helical flow control element 704 may have a similar effect on the fluid flow as the helical flow control element 604 described above.

Figure 8:
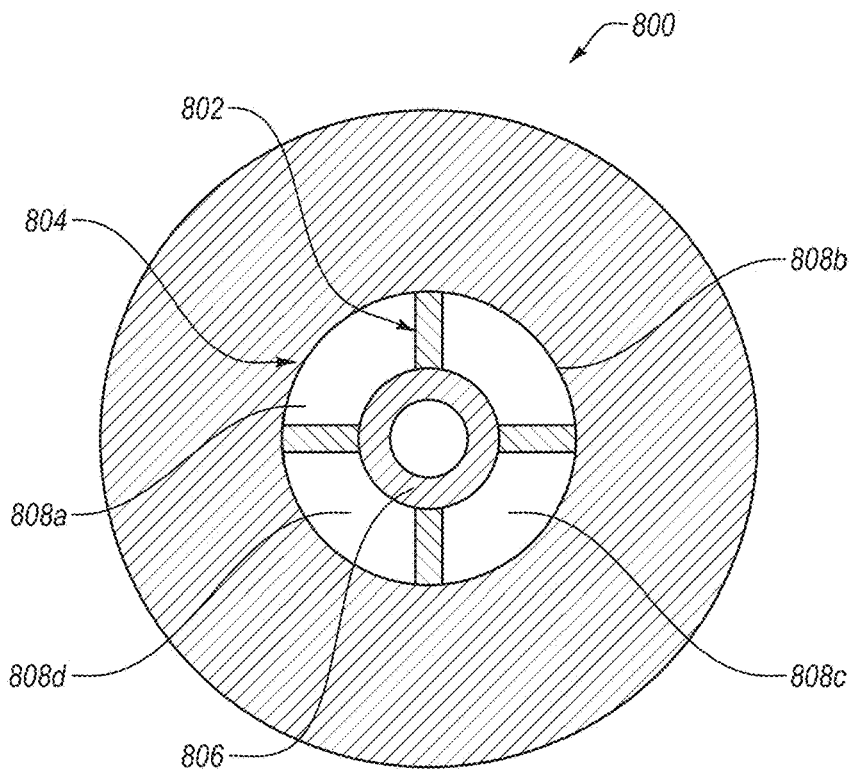

FIG. 8 illustrates a reactor 800 including a helical flow control element 804 in the core 802 of the reactor 800. The helical flow control element 804 may include multiple blades 808a, 808b, 808c, 808d, such as at least two blades, at least three blades, or at least four blades. The multiple blades 808a, 808b, 808c, 808d may each extend around the shaft 806 in substantially parallel helical paths. The multiple blades 808a, 808b, 808c, 808d may increase the surface area of the helical flow control element 804 while maintaining a larger angle 408 and pitch 404. The greater pitch 404 and angle 408 may decrease pressure loss within the core 802. The multiple blades 808a, 808b, 808c, 808d may also decrease the channel width 406, at least because for each revolution about the shaft 806 each of the multiple blades 808a, 808b, 808c, 808d may extend about the shaft 806.

Figure 9:
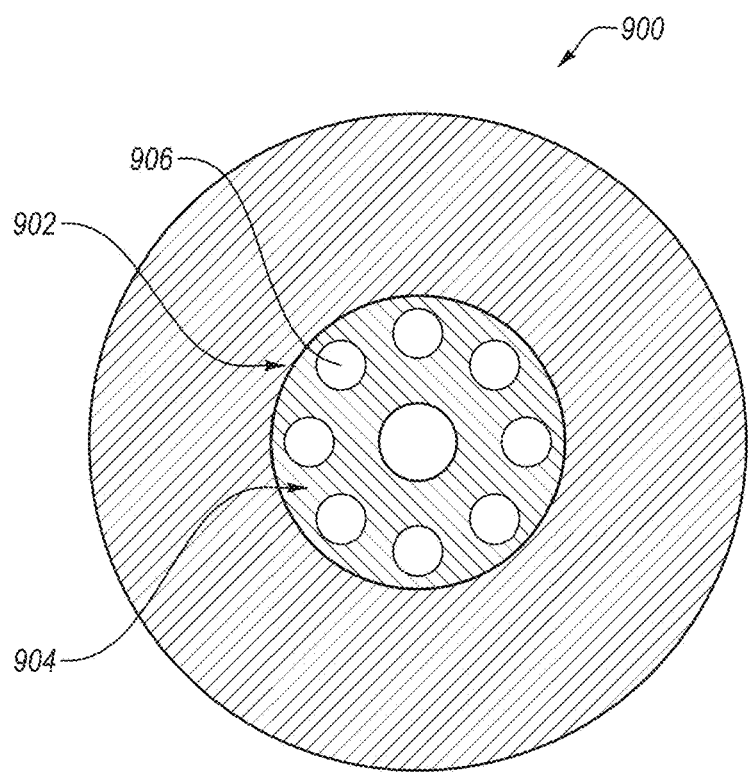

FIG. 9 illustrates a reactor 900 including a helical flow control element 904 in the core 902 of the reactor 900. The helical flow control element 904 may include multiple fluid tubes 906 arranged radially about the core 902. The fluid tubes 906 may travel in helical paths similar to the blades of the helical flow control elements 604, 704, 804 described above. The fluid tubes 906 may enable a separation between the fluid and the other materials in the core 902. For example, in a solid fuel reactor, the fluid tubes 906 may enable the cooling fluid to travel helically through the core 902 without contacting the fuel in the core 902. In some embodiments, the fluid tubes 906 may include internal blades or vanes configured to induce helical flow within the fluid tubes 906 to reduce pressure loss through the fluid tubes 906 and/or to increase heat transfer within the fluid tubes 906.

Figure 10:
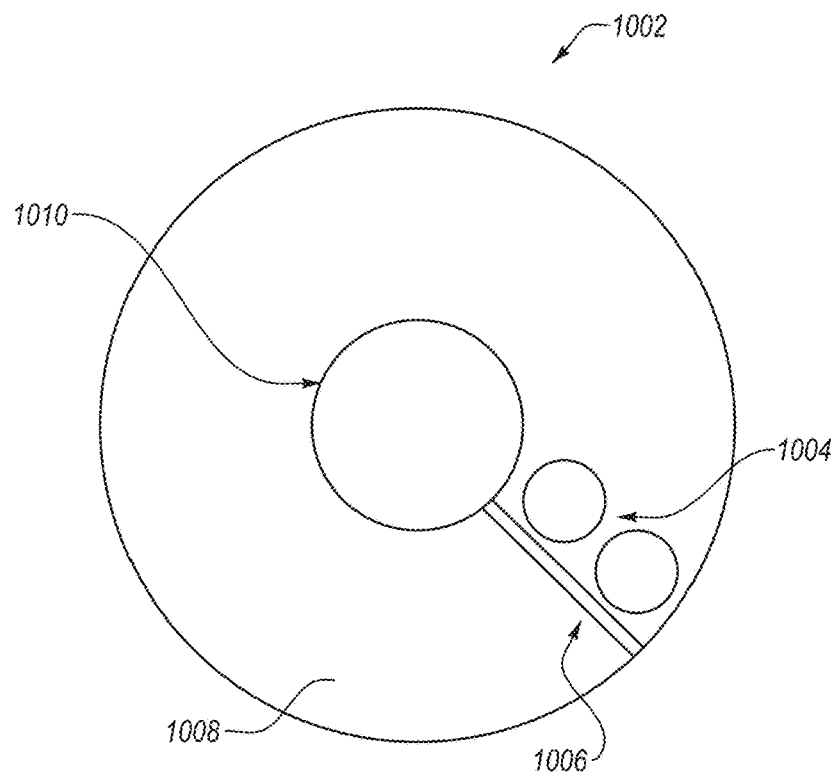
FIG. 10 illustrates a top down view of a flow control element in accordance with embodiments of the present disclosure.
Figure 11:
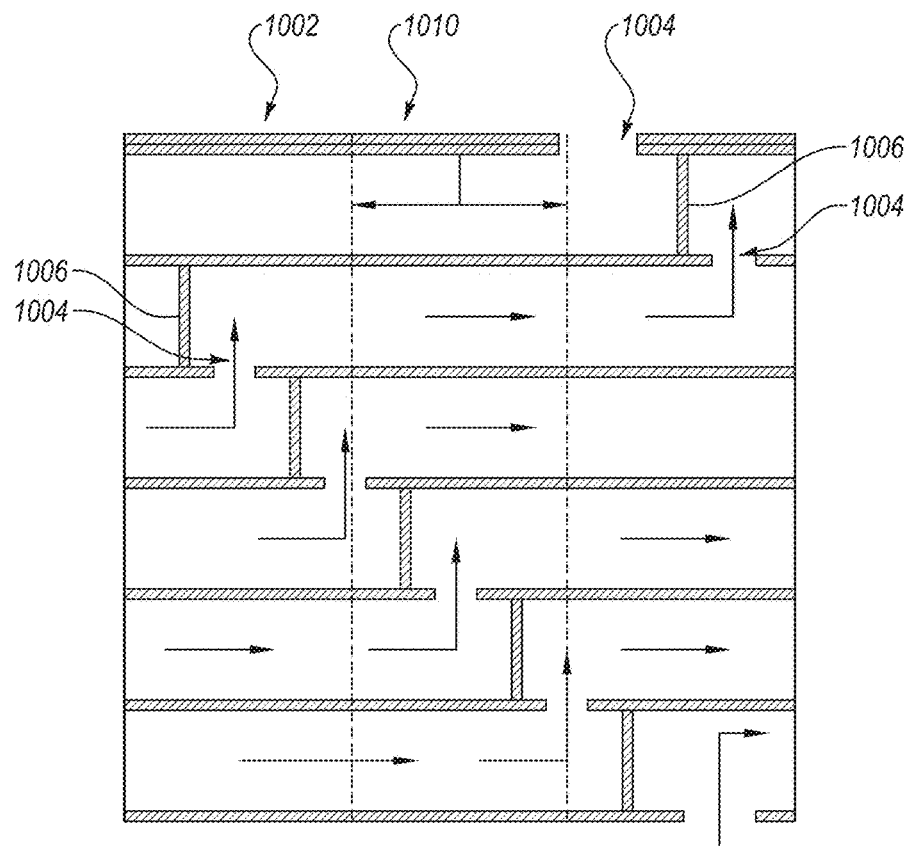
FIG. 11 illustrates a cross-sectional view of the flow control element of FIG. 10.

FIGS. 10 and 11 illustrate different views of another embodiment of a flow control element 1002. The flow control element 1002 may include multiple stacked disks 1008. FIG. 10 illustrates a top down view of a single disk 1008 of the flow control element 1002 and FIG. 11 illustrates a cross-sectional side view of the flow control element 1002. The disks 1008 may surround a tubular cavity 1010 in a center of the flow control element 1002. Each disk 1008 may include one or more apertures 1004 positioned in a radial row in substantially the same angular position. Each disk 1008 may also include a partition 1006 positioned adjacent to the apertures 1004. The partitions 1006 may be configured to substantially prevent a fluid flowing around the volume defined between two adjacent disks 1008 more than one time and/or may cause the fluid to flow through the longer distance to the apertures 1004 through the adjacent disk 1008.

As illustrated in FIG. 11, the apertures 1004 and partitions 1006 in adjacent disks 1008 may be in different angular positions, such that the fluid flowing through the apertures 1004 in a first disk 1008 may be directed to flow about the tubular cavity 1010. Thus, the multiple disks 1008 may substantially increase the time the fluid is within the core of the associated reactor. As described above, increasing the amount of time the fluid is within the core of the reactor may increase the reactions generated in the fluid and/or increase the heat transferred to the fluid.

The apertures 1004 may be sized and configured to restrict flow of the fluid through each disk 1008 while maintaining a flow of the fluid through the core of the associated reactor. For example, if the fluid has a high viscosity, the disks 1008 may include a small number of relatively large apertures 1004. If the fluid has a low viscosity, the disks 1008 may include a larger number of relatively smaller apertures 1004.

Embodiments of the present disclosure may be formed from processes such as material removal machining processes (e.g., milling, lathe, water jetting, laser jetting, wire EDM, etc.), material additive processes (e.g., 3-D printing), adaptive manufacturing, thermal-hydraulic prototypic designs and fabricators, and/or assembly processes (e.g., welding, soldering, etc.). Some processes, such as 3-D printing may enable greater control of the dimensions and/or properties of the elements. In some embodiments, using an assembly process may reduce complexity of the assembly.

In some embodiments, the flow control devices may be positioned outside the core of the associated nuclear reactor. For example, the flow control devices may be positioned proximate the core, such as near the inlet or outlet or the flow control device may be positioned away from the core, such as in a downcomer or return fluid path.

The embodiments of the present disclosure may provide flow control devices (e.g., flow control elements) for nuclear reactors. Flow control devices may enable reactor designers to control the amount of time that different fluids are present in different portions of the reactor. Controlling the time that the fluids are in different portions of the reactor may enable neutron activity and heat to be distributed over a greater portion of the core of the reactor. A more even neutron activity and heat distribution in the core may increase the stability of the power response in the reactor.

Controlling the time that the fluids are in different portions of the reactor may also enable the neutron efficiency of a reactor to be increased. Increasing the neutron efficiency may enable the amount of fuel in the reactor to be reduced, which may reduce the size of the reactor and/or make it easier to transport the reactor. Increasing the neutron efficiency of the reactor may also enable the reactor to function for a longer period of time on a specified amount of fuel increasing the life cycle of the reactor and/or the time between refueling.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A helical fluid flow control device configured to be positioned in a reactor core, the helical fluid flow control device comprising:
   a central shaft; and
   at least one helical blade extending from the central shaft, the at least one helical blade defining an outer diameter of the helical fluid flow control device configured to fit within a width of the reactor core,
   the at least one helical blade including a first segment comprising a moderating material in a first axial position and a second segment comprising a reflective material different from the moderating material of the first segment, the second segment in a second axial position vertically above the first axial position, the first segment having a first pitch and the second segment having a second pitch smaller than the first pitch.

2. The helical fluid flow control device of claim 1, further comprising a central shaft.

3. The helical fluid flow control device of claim 1, wherein a material of the at least one helical blade in the first segment is different from a material of the at least one helical blade in the second segment.

4. The helical fluid flow control device of claim 1, wherein a material of the at least one helical blade is selected from the group consisting of graphite, beryllium, steel, tungsten, carbide, and gold.

5. The helical fluid flow control device of claim 1, further comprising a central shaft including one or more electronic devices.

6. The helical fluid flow control device of claim 5, wherein the one or more electronic devices include a sensor.

7. The helical fluid flow control device of claim 5, wherein the one or more electronic devices include a heating element.

8. The helical fluid flow control device of claim 1, further comprising a surface cladding redox control material over at least one surface of the at least one helical blade.

9. A nuclear reactor comprising:
   a reactor core including a helical fluid flow control device including a central shaft and at least one helical blade extending from the central shaft, the at least one helical blade defining an outer diameter of the helical fluid flow control device configured to fit within a width of the reactor core, the helical fluid flow control device configured to induce helical flow in a fluid traveling through the reactor core,
   the at least one helical blade including a first segment comprising a moderating material in a first axial position and a second segment comprising a reflective material different from the moderating material of the first segment, the second segment in a second axial position vertically above the first axial position, the first segment having a first pitch and the second segment having a second pitch smaller than the first pitch.

10. The nuclear reactor of claim 9, wherein the at least one helical blade extends from a central shaft.

11. The nuclear reactor of claim 10, wherein the at least one helical blade extends helically about the central shaft.

12. The nuclear reactor of claim 9, wherein the reactor core is configured to contain a solid nuclear fuel and the helical fluid flow control device is positioned and configured to induce the helical flow in a cooling fluid.

13. The nuclear reactor of claim 9, wherein the reactor core is configured to contain a liquid nuclear fuel and the helical fluid flow control device is positioned and configured to induce the helical flow in the liquid nuclear fuel.

14. The reactor of claim 13, wherein the helical fluid flow control device includes at least one heating element in a central shaft of the helical fluid flow control device, the at least one heating element configured to provide melt initiation for the liquid nuclear fuel.

15. The reactor of claim 9, wherein the helical fluid flow control device comprises one or more fluid flow tubes arranged radially about the reactor core, wherein the one or more fluid flow tubes travel in helical paths about the reactor core.

16. A method of controlling fluid flow through a nuclear reactor comprising:
   inducing a flow of a fluid upward through a reactor core of a nuclear reactor;
   causing the fluid to flow helically about a central axis of the reactor core, the reactor core comprising a helical fluid flow control device including a central shaft and at least one helical blade extending from the central shaft, the at least one helical blade defining an outer diameter configured to fit within a width of the reactor core, the at least one helical blade configured to cause the helical fluid flow; and
   changing fluid flow characteristics of the fluid at different axial positions defined along the at least one helical blade, wherein a first segment of the at least one helical blade is formed from a moderating material and the first segment of the at least one helical blade is in a first axial position along the at least one helical blade has a first pitch and a second segment of the at least one helical blade is formed from a reflective material different from the moderating material of the first segment and the second segment of the at least one helical blade is in a second axial position along the at least one helical blade vertically above the first axial position of the first segment and the second segment has a second pitch smaller than the first pitch of the first segment.

17. The method of claim 16, wherein inducing the flow of the fluid upward through the reactor core of the nuclear reactor comprises heating the fluid in the reactor core and inducing the flow through natural convection.

18. The method of claim 16, wherein inducing the flow of the fluid further comprises inducing the flow of a cooling fluid.

19. The method of claim 16, wherein inducing the flow of the fluid further comprises inducing the flow of a liquid nuclear fuel.

\* \* \* \* \*